(12) United States Patent
Ocher

(10) Patent No.: US 11,057,389 B2
(45) Date of Patent: Jul. 6, 2021

(54) SYSTEMS AND METHODS FOR AUTHORIZING ACCESS TO COMPUTING RESOURCES

(71) Applicant: SAP SE, Walldorf (DE)

(72) Inventor: Alexander Ocher, San Jose, CA (US)

(73) Assignee: SAP SE, Walldorf (DE)

(*) Notice: Subject to any disclaimer, the term of this patent is extended or adjusted under 35 U.S.C. 154(b) by 225 days.

(21) Appl. No.: 15/952,739

(22) Filed: Apr. 13, 2018

(65) Prior Publication Data
US 2019/0319958 A1 Oct. 17, 2019

(51) Int. Cl.
*H04L 29/06* (2006.01)
*G06Q 10/06* (2012.01)

(52) U.S. Cl.
CPC ....... *H04L 63/102* (2013.01); *G06Q 10/0631* (2013.01); *H04L 63/08* (2013.01); *H04L 63/105* (2013.01); *H04L 63/18* (2013.01)

(58) Field of Classification Search
CPC ..... H04L 63/105; H04L 63/08; H04L 63/108; H04L 63/102; H04L 63/18; H04L 63/083; G06Q 10/0631
See application file for complete search history.

(56) References Cited

U.S. PATENT DOCUMENTS

| | | | | |
|---|---|---|---|---|
| 7,761,909 B2* | 7/2010 | Barrett | ................ | H04L 63/0815 726/4 |
| 9,043,878 B2* | 5/2015 | Terris | .................... | H04L 63/105 726/4 |
| 2003/0229812 A1* | 12/2003 | Buchholz | ............... | G06Q 10/10 726/4 |
| 2013/0174234 A1* | 7/2013 | Yang | ................... | H04L 63/0815 726/6 |
| 2014/0172184 A1* | 6/2014 | Schmidt | ................ | G05B 15/02 700/295 |
| 2014/0337260 A1* | 11/2014 | Narasimha | ......... | G06Q 30/0201 706/14 |
| 2015/0100503 A1* | 4/2015 | Lobo | .................... | G06Q 10/103 705/301 |
| 2015/0227749 A1* | 8/2015 | Schincariol | .......... | G06F 9/5072 726/28 |
| 2015/0358331 A1* | 12/2015 | Rachalwar | ............ | H04L 63/102 726/7 |

(Continued)

*Primary Examiner* — Mohammad A Siddiqi
(74) *Attorney, Agent, or Firm* — Fountainhead Law Group P.C.

(57) ABSTRACT

Embodiments of the present disclosure pertain to accessing computing resources. In one embodiment, the present disclosure includes a computer implemented method comprising storing at least one credential for accessing a first system, storing a plurality of user credentials for a plurality of users having access to a second system, linking the plurality of user credentials for the plurality of users having access to the second system to the at least one credential for accessing the first system, receiving a first user credential for a first user from the second system over a first connection, authenticating the first user credential, wherein the first user credential is authenticated when the first user credential matches one of the stored plurality of user credentials, and establishing a second connection between the first system and the second system using the at least one credential when the first user credential is authenticated.

20 Claims, 5 Drawing Sheets

(56) References Cited

U.S. PATENT DOCUMENTS

| | | | |
|---|---|---|---|
| 2017/0111842 A1* | 4/2017 | Manroa | H04W 8/18 |
| 2018/0241750 A1* | 8/2018 | Serban | H04L 63/0861 |
| 2018/0278607 A1* | 9/2018 | Loladia | H04L 63/0823 |
| 2018/0329754 A1* | 11/2018 | Nie | G06F 9/5044 |
| 2019/0050551 A1* | 2/2019 | Goldman-Kirst | H04L 9/3213 |

* cited by examiner

SYSTEMS AND METHODS FOR AUTHORIZING ACCESS TO COMPUTING RESOURCES

BACKGROUND

The present disclosure relates to computing, and in particular, to systems and methods for authorizing access to computing resources.

In modern computing, it is often the case that functionality of various systems are distributed. For example, one system may be optimized for one set of functions, while another system may be optimized for another set of functions. FIG. 1 illustrates one problem commonly occurring in modern computing systems. In FIG. 1, multiple users may access the resources of system 110. However, it may be desirable for users of system 110 to access data and/or functionality of another system 120 to carry out certain tasks. For example, system 110 may be a data service, and users of the data service may want to access data in system 120 to perform various data processing tasks. However, system 120 may include an authentication system 121 for authorizing access to one set of users (e.g., Users 1-M), while system 110 may include a different authentication service 111 for authorizing access to another set of users (e.g., Users 1-N). Typically, for users of system 110 to access system 120, they generally have two bad choices. First, users of system 110 may be given authentication accounts in system 120. This creates an administrative burden for information technology resources to manage potentially double the number of authentication issues for two systems. Second, users of system 110 may share one authentication credential. This approach is problematic for several reasons. First, sharing an authentication may violate the terms of service of system 120, which may prevent an organization from telling each user the credential to system 120 so that each user can manually enter it. Additionally, if an error occurs with one user's authentication (e.g., multiple misspelled passwords), system 120 may lock out everyone sharing the authentication credentials.

Embodiments of the disclosure provide advantageous techniques for authorizing access to computing resources.

SUMMARY

Embodiments of the present disclosure pertain to accessing computing resources. In one embodiment, the present disclosure includes a computer implemented method comprising storing, in a first software component, at least one credential for accessing a first system, storing, in the first software component, a plurality of user credentials for a plurality of users having access to a second system, linking, in the first software component, the plurality of user credentials for the plurality of users having access to the second system to the at least one credential for accessing the first system, receiving, in the first software component, a first user credential for a first user from the second system over a first connection, authenticating the first user credential, wherein the first user credential is authenticated when the first user credential matches one of the stored plurality of user credentials, and establishing a second connection between the first system and the second system using the at least one credential when the first user credential is authenticated.

In one embodiment, the techniques further comprise linking one or more user credentials from the second system with the at least one credential for accessing the first system.

In one embodiment, the techniques further comprise linking a first plurality of user credentials from the second system with a first credential for accessing a first resource on the first system and linking a second plurality of user credentials from the second system with a second credential for accessing a second resource on the first system;

In one embodiment, the techniques further comprise linking a second one or more user credentials from the second system with the at least one credential for accessing a third system.

In one embodiment, the techniques further comprise performing, by the first software component, a query comprising the first user credential, and in accordance therewith, retrieving a resource identification specifying the first system and a credential for accessing data or functionality for the first system.

In one embodiment, the second connection is only available for use by the first user based on the first user credential.

In one embodiment, the at least one credential is assigned to the first user by a second user having an account on the first system and provides limited access to the first system by the first user.

In one embodiment, a scope of limited access is specified by the second user having an account on the first system.

In one embodiment, a scope of limited access is read only.

In one embodiment, the second system is a web based application and the first system is a web based application.

In one embodiment, the first software component is an authentication server, the second system is a data service, and the first system is an enterprise resource planning system.

In one embodiment, the techniques further comprise storing, in a first software component, at least one resource identification specifying one of a plurality of systems as the first system and linking, in the first software component, the resource identification to the plurality of user credentials for the plurality of users having access to the second system and the at least one credential for accessing the first system;

In one embodiment, the techniques further comprise establishing the second connection between the first software component and the second system and sending the second connection from the first software component to the first system over the first connection to establish the second connection between the first system and the second system.

In one embodiment, sending the second connection from the first software component to the first system over the first connection comprises sending a handle to the second connection.

In one embodiment, the techniques further comprise sending the at least one credential from the first software component to the first system when the first user credential is authenticated and establishing, by the first system, the second connection between the first system and the second system using the at least one credential.

In one embodiment, the first software component stores a plurality of credentials corresponding to different roles on the first system, and wherein different credentials corresponding to different roles provide different access rights to different users of the second system.

In one embodiment, the techniques described herein are implemented as non-transitory machine-readable medium storing a program executable by at least one processing unit of a computer, the program comprising sets of instructions for performing the process steps.

In another embodiment, the present disclosure includes a computer system comprising a processor and a non-transitory machine-readable medium storing a program executable by the processor, the program comprising sets of instructions for performing the process steps.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
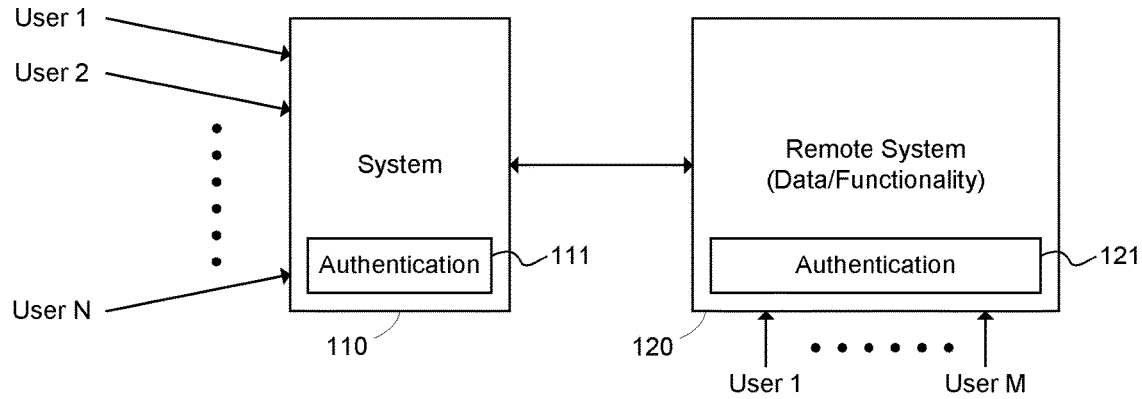
FIG. 1 illustrates one commonly occurring challenge in modern computing systems.
Figure 2:
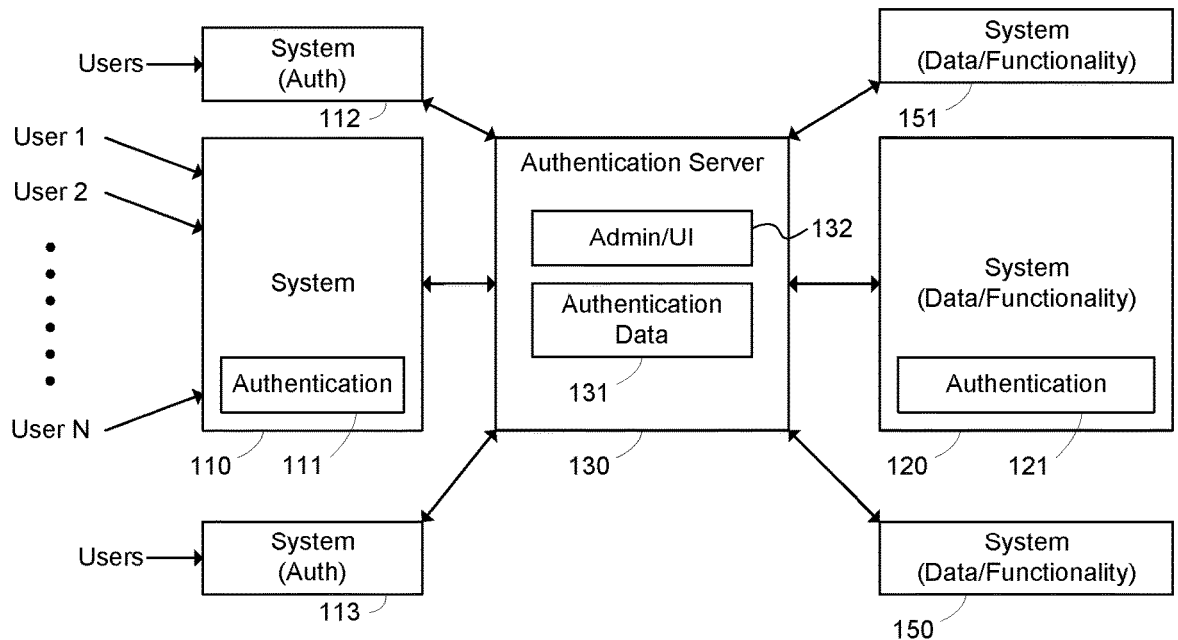
FIG. 2 illustrates an authentication system according to an embodiment.

FIG. 2 illustrates an authentication system according to an embodiment. In this embodiment, a first system 110 may be accessed by a plurality of users (User 1-N). As each user accesses the functionality and data available in system 110, each user must enter a user specific credential to authorize the user to access system 110. One common example of a credential is a username and password. Accordingly, when each user enters their unique credential, the user's credential may be authenticated by component 111 and, if authenticated, a particular user is granted access to system 110's resources. However, the credential for system 110 may only allow access to resources on system 110. In some situations, a user of system 110 may desire access to resources (e.g., data and/or functionality) of another system 120. The resources of system 120 may have their own authentication processes 121 that require a credential to access. As mentioned above, sharing such credentials with all the users of system 110 (i.e., such that each user must manually enter the shared credential) or creating unique credentials for each user on both systems is undesirable.

Features and advantages of the present disclosure include a software component for efficiently authenticating users of one system on another system. For example, embodiments of the present disclosure may include an authentication server 130. While the present disclosure describes embodiments using an authentication server, it is to be understood that the features and functions of the authentication server may be included in one or more other software components, which may be stand-alone or included with system 120 or system 110, for example. In this example, credentials for the plurality of users (User 1-User N) of system 110 may be stored as authentication data 131 in authentication server 130. Accordingly, the unique credential, such as a unique username/password combination, for each user of system 110 is stored in authentication server 130. Additionally, at least one credential for accessing resources in system 120 may be stored as authentication data 131 in authentication server 130. In some embodiments, a single system 120 may include multiple resources (e.g., functionality and/or data stores) that have individual authentication components requiring different credentials. Thus, authentication server 130 may store multiple credentials for accessing different unique resources on system 120, for example.

Furthermore, authentication server 130 may store unique credentials for multiple different systems 150-151, for example. In one embodiment, credentials of multiple users of system 110 may be linked with at least one credential for system 120. Similarly, credentials of users of system 110 may be linked with multiple credentials for different resources on one or more of systems 120, 150, and 151 (e.g., data stores), for example.

Similarly, multiple users on multiple different systems 110, 112, and 113 may access authentication server 130 to access any one or more of systems 120, 150, and 151 or particular resources in such systems using the techniques described herein. In one embodiment, multiple authentication servers may allow access to one or more remote system resources. For example, in one embodiment authentication server 130 may be a cloud service where multiple agents have access to the same database of credentials or the database is replicated (e.g., for each client) across different locations, for example. Example benefits may include getting to the closest client, for example, either manually or automatically.

As mentioned above, the authentication server may be included in one or more other software components, which may be stand-alone or included with system 120 or system 110, for example. In one embodiment, the authentication server can also be a part of system 110 itself (e.g., a data service). In this case, a connection between system 110 and server 130 is an intra-process call that returns credentials for system 120 (e.g., ERP credentials) if the user has valid credentials for authorization server. Example code for retrieving remote credentials for a remote system from an authentication component based on a particular user's username and password on a local system is as follows:

```
int rc = AuthServer::authenticate(user, password, new_user, new_password);
if (rc != 0)
    //error
```

Where "rc" is an integer code indicating whether the authentication was successful (rc=0 is successful; rc!=0 is an error), user and password are the credentials for the local system, and new_user and new_password are the credentials for the remote system 120, for example.

In one embodiment, system 110 is a data service, system 120 is an enterprise resource planning system, and component 130 is an authentication server, for example. It is to be understood that system 110 and system 120 may include a number of different systems. In some embodiments, the techniques described herein may be used to provide limited access to a system. For example, in some implementations, features and advantages of the present disclosure may be used by users of system 120 to give limited access to other users to certain information that might previously have been accessed only by giving out usernames and passwords. For example, in one embodiment, at least one credential for accessing system 120 may be assigned to a first user who does not have an account on system 120 by a second user having an account on system 120, for example. The credential may provide limited access to system 120 by the first user. In one embodiment, system 120 is a web application (e.g., facebook, LinkedIn, online banking, etc.), and the second user who has an account on the web application desires to allow the first user (who does not) limited access to their account (e.g., read only privileges to view certain information over limited time frames, etc.). The second user may use an administrative tool in the web application to generate a limited use credential for the first user to log in (e.g., that expires after 24 hours). Once the credential is created, the web application may store the limited use credential in an authentication component such as server 130, for example. In one embodiment, the authentication component may be part of system 110 or 120 and available over the Internet (e.g., a web application). In another embodiment, system 110 is an electronic mail system requiring a username and password to access. If the first user has an account on system 110, the first user may log in, cause a query to be generated for limited use credentials, and retrieve the limited use credential for system 120 using the techniques described herein. The user of system 110 may use the limited use credential for accessing the account of the other user on system 120.

Figure 3:
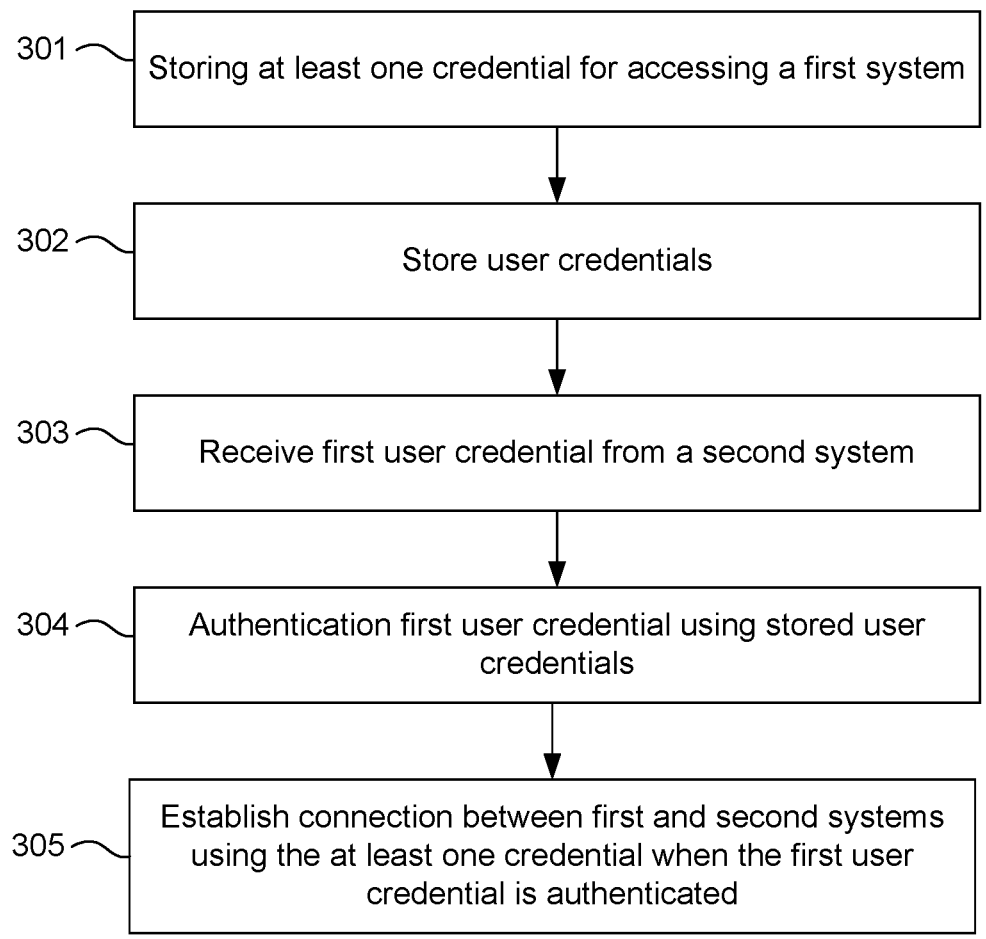
FIG. 3 illustrates an authentication process according to an embodiment.

FIG. 3 illustrates an authentication process according to an embodiment. The flow chart in FIG. 3 shows how users of system 110 may access resources on another system 120 according to the embodiment of FIG. 2. At 301, at least one credential for accessing a first system, such as system 120, is stored in a first software component, such as an authentication server 130, for example. At 302, user credentials for users of another system, such as system 110, are stored in the first software component. When a first user of system 110 desires to use the resources of system 120, the following occurs. First, a first connection between system 110 and authentication server 130 is opened. The first connection may be a TCP/IP connection, for example. System 110 sends the credential for the first user to the authentication server 130. At 303, the authentication server 130 receives the user credential for the first user from system 110 over the first connection. As mentioned above, user credentials from system 110 may be linked to credentials for system 120. At 304, the first user credential is authenticated, wherein the first user credential is authenticated when the first user credential matches one of the stored plurality of user credentials linked to the credential for system 120, for example. When a received user credential is authenticated for system 120, then a second connection between system 110 and system 120 may be established using the at least one credential for system 120 stored on authentication server 130. Various example embodiments for establishing the connection once the user credential is established are described below.

Figure 4:
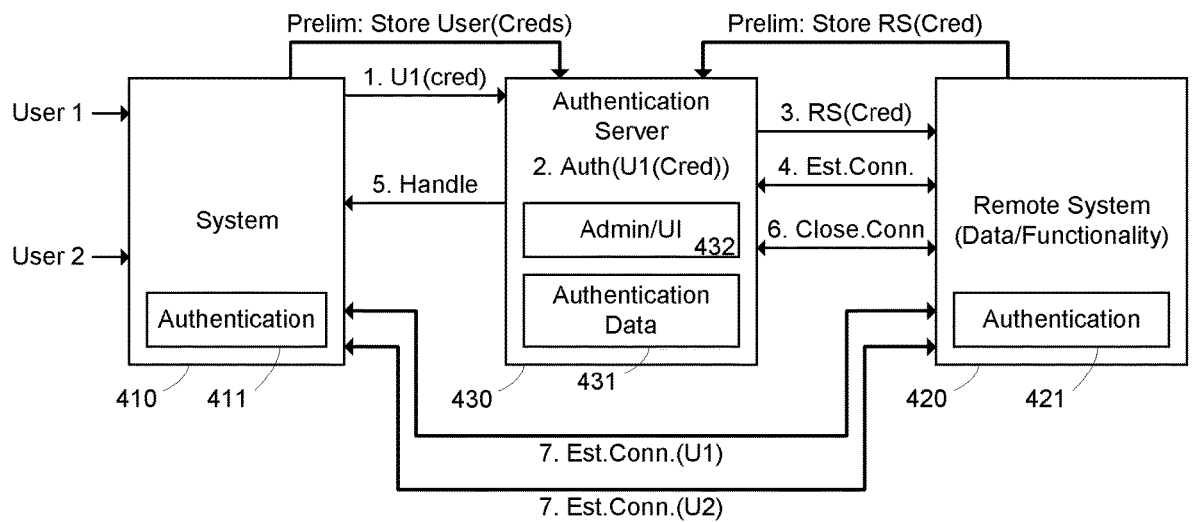
FIG. 4 illustrates an example authentication system according to an embodiment.

FIG. 4 illustrates an example authentication system according to an embodiment. In this example, two users, User 1 and User 2, of system 410 desire to access data and/or functionality on a remote system 420. System 410 stores credentials for users 1 and 2 and may include local authentication component 411 for allowing users to access local resources on system 410. Similarly, system 420 may store credentials and may include authentication component 421 for permitting access to resources (data and/or functions) of system 420. Initially, credentials for users 1 and 2 are stored as authentication data 431 in authentication server 430. Additionally, credentials for accessing remote system 420 may be stored as authentication data 431 in authentication server 430. As mentioned above, user credentials for users 1 and 2 may be linked to the credential for accessing remote system 420 on authentication server 430. These storage and/or linkage operations may be performed by a system administrator by accessing an administrative user interface (UI) 432, for example.

When user 1 desires to access remote system 420, system 410 sends user 1's credentials to authentication server 430 at step 1 (U1(cred)) over a first connection (e.g., a TCP/IP connection). Authentication server 430 then authenticates the received credential at step 2 (Auth(U1(cred))). For example authentication server 430 may perform a lookup or other query on a table of user credentials, for example, to determine if the received user credential is stored in the table. If the received user credential does not match a user credential in the table, access is denied. However, if the received user credential matches a credential in a table, then the lookup may return a credential to remote system 420 that is associated with the user credential in the table, for example. The following is an example table data structure for the users of the authentication server, which contains user name and password for local users and remote systems:

```
CREATE TABLE remote_users
(
user char(128),
password char(1024),
remote_user char(128),
remote_password char(1024)
);
```

In another embodiment, the data structure may include the target system, for enterprise needs, and fields such as changed on or "changed by." Thus, another example data structure may be as follows:

```
CREATE TABLE remote_users
(
user char(128),
password char(1024),
remote_user char(128),
remote_password char(1024),
target_system char(512),
created_by char(128),
created_on datetime
);
```

Sample values for the above table may be: user=User1, password=Password1, remote_user=NAME_PROD_115, remote_password=SecretPassword1@115, target_system=Q08, created_by=sysadm, and created_on=03/15/2018 17:03 So, user User1 with password Password1 on a local system can request an access to system Q08, and the authentication server would respond with remote_user NAME_PROD_115 and remote_password SecretPassword1@115. As described in more detail below, target system (e.g., Q08) is one example of a resource identification to specify a particular system to be accessed, for example.

In this example, establishing a connection between systems 110 and 120 includes establishing a connection between the first software component (here, authorization server 430) and system 420 and then sending the connection from authorization server 430 to system 410 over the connection between system 110 and server 430 to establish the connection between system 110 and system 120. For example, once user 1's credential is authenticated, the credential for system 420 that associated with user 1's credential (e.g., in a table) is sent to system 420 at step 3 (RS(cred)). The credential is authenticated by system 420 using authentication component 421. Once authentication on system 420 is completed, a new connection is established at step 4 (Est.Conn.). The new connection between system 420 and server 430 may be a bidirectional socket connection built on TCP/IP where calls may be made from one system to another system using logical components to access functions on a remote system, for example. At step 5, a handle to the new connection is sent from the authentication server 430 to system 410, and at step 6 server 430 may close the authentication server's side of the connection. The handle may be used to reopen the connection from system 410 so that a connection between system 410 and 420 is established as illustrated at step 7 (Est.Conn(U1)). For example, authentication server 420 may open a socket, pass the socket number to data service (DS) 410, then the DS binds to the same socket. User 1 may now access the resources of system 420 over a connection between system 410 and system 420.

In one embodiment, the connection between system 410 and system 420 is only available for use by the first user (here, User 1) based on the first user credential. The connection is not open for other users of system 410. In this example, when user 2 desires to access system 420, user 2's credential is sent to authentication server 430 at step 1. Similar to the process for user 1 described above, user 2's credential may be authenticated, and a new connection opened between server 430 and system 420. A handle to the new connection for user 2 is then passed back to system 410, and server 430 closes its side of the new connection. System 410 then uses the handle to open a connection to system 420 for user 2 (Est.Conn.(U2)). Similarly, users of system 410 may access one or more resources on remote system 420 or other systems using a similar procedure. Each user specific connection may be used to access resources of system 420 while advantageously simplifying the authentication process.

Figure 5:
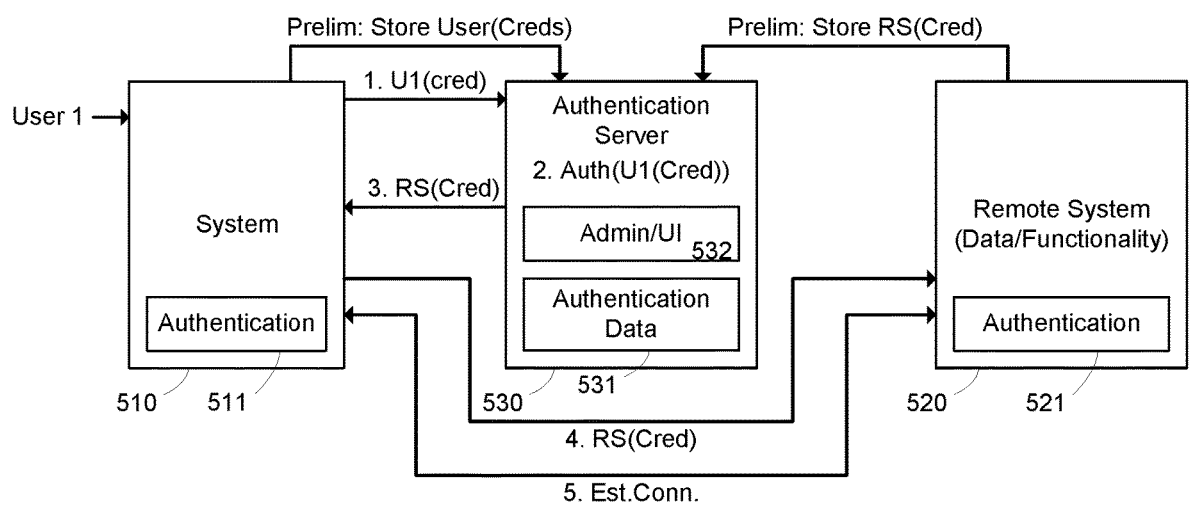
FIG. 5 illustrates an example authentication system according to an embodiment.

FIG. 5 illustrates an example authentication system according to an embodiment. This example illustrates an alternative approach to establishing a connection between a system 510 and remote system 520. As described above, user credentials for system 510 and credentials for accessing data and/or functionality of system 520 are stored and linked as authentication data 531 on authentication server 530. In this example, after user 1 of system 510 causes their credential to be received and authenticated by server 520, the credential for system 520 that is associated with user 1's credential is sent back to system 510 (e.g., over the same connection used to send U1(cred) such as a TCP/IP connection). Accordingly, the credential for the remote system 520 is received by system 510 (RS(cred)) at step 3. This credential may be sent by system 510 to system 520 to open a new connection directly between systems 510 and 520, for example as illustrated at step 4. At step 5, a new connection between system 510 and system 520 is established and available for use by user 1. Other users may similarly open user specific connections according to the same process, for example.

Figure 6:
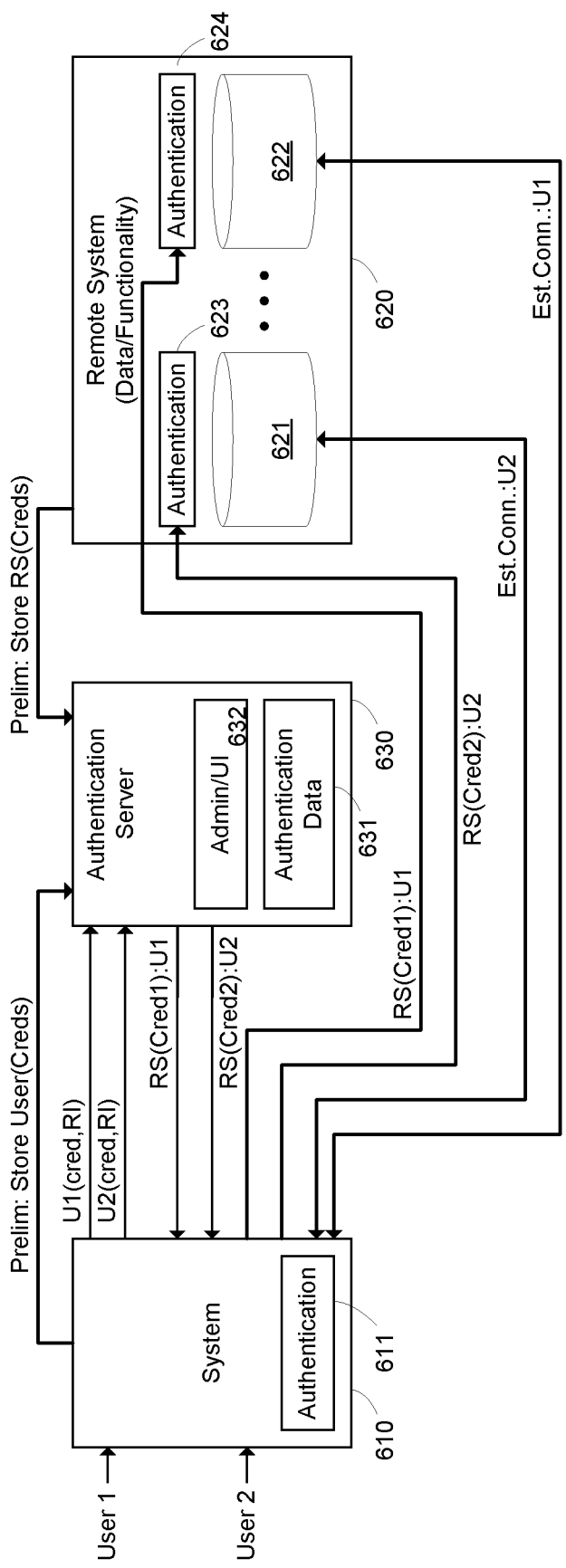
FIG. 6 illustrates an example authentication system according to another embodiment.

FIG. 6 illustrates an example authentication system according to another embodiment. In this example, a remote system 620 includes a plurality of resources (e.g., data stores) that have independent authentications (i.e., different credentials are required for different subsystems). Accordingly, user credentials for system 610 are stored in authentication server 630 together with credentials for accessing subsystems 621 and 622 (e.g., data stores) on remote system 620 (e.g., by an administrator using admin/UI component 632). Particular user credentials may be linked to either or both credentials for data stores 621 and 622, for example. In this example, user 1 desires to extract data from data store 622 and process the data in system 610, and user 2 desires to extract data from data store 621 and process the data in system 610, for example. Accordingly, user 1's credential and user 2's credential may be received by authentication server 630. If both credentials are authenticated (e.g., using query functions), then the credentials for data stores 621 and 622 associated with the user's credentials may be retrieved.

In one embodiment, when system 610 sends the user's credentials, system 610 also sends an identification of the system or resource (collectively, a resource identification, "RI") to be accessed. When the user credential and resource identification are received by server 630, the user credential and resource identification may be included in a query to retrieve a credential for accessing the system or subsystem corresponding to the resource identification (e.g., data store 621 or data store 622). In another embodiment, system 610 sends a user credential, and the user credential is associated with a remote system credential and a resource identification specifying the target system (e.g. Q08 as illustrated above). Accordingly, a target system or particular resource may be identified for establishing a connection with system 610, for example.

In another embodiment, credentials stored in the authentication server may determine the scope of access available on system 620. For example, authentication server 630 may include a first credential for a remote system corresponding to a user having a financial role "fico1" (FI/CO—finance/controlling) with corresponding access to financial information. Authentication server 630 may include a second credential for a remote system corresponding to a user having a human resource role"hr1" (HR) with corresponding access to employee information. In this embodiment, authentication server 630 may store a plurality of different credentials corresponding to different roles and access privileges in one or more remote systems. Accordingly, different credentials in the authentication server may determine the scope of access to remote system 620—e.g., credential1 for a FI/CO data store and credential2 for an HR data store. Alternatively, a resource identification may be included in the authentication process (e.g., user1/pass1/"FICO" or user1/pass1/"HR"—i.e., same user, same password, different additional identifier) to ensure that a particular user's credential is associated with the particular resource being accessed, for example.

Referring again to FIG. 6, authentication server 630 sends a first credential for user 1 to access data store 622 and a second credential for user 2 to access data store 621. Accordingly, the first and second credentials for accessing remote data stores 620 and 621 are sent to system 610 (RS(cred1):U1 and RS(cred2):U2). In this example, the first credential is sent to authentication component 624 in remote system 620 to grant user 1 access to data store 622, and the second credential is sent to authentication component 623 in remote system 620 to grant user 2 access to data store 621. Independent connections may be established between system 610 and data store 622 (for user 1) and between system 610 and data store 624 (for user 2), for example.

Figure 7:
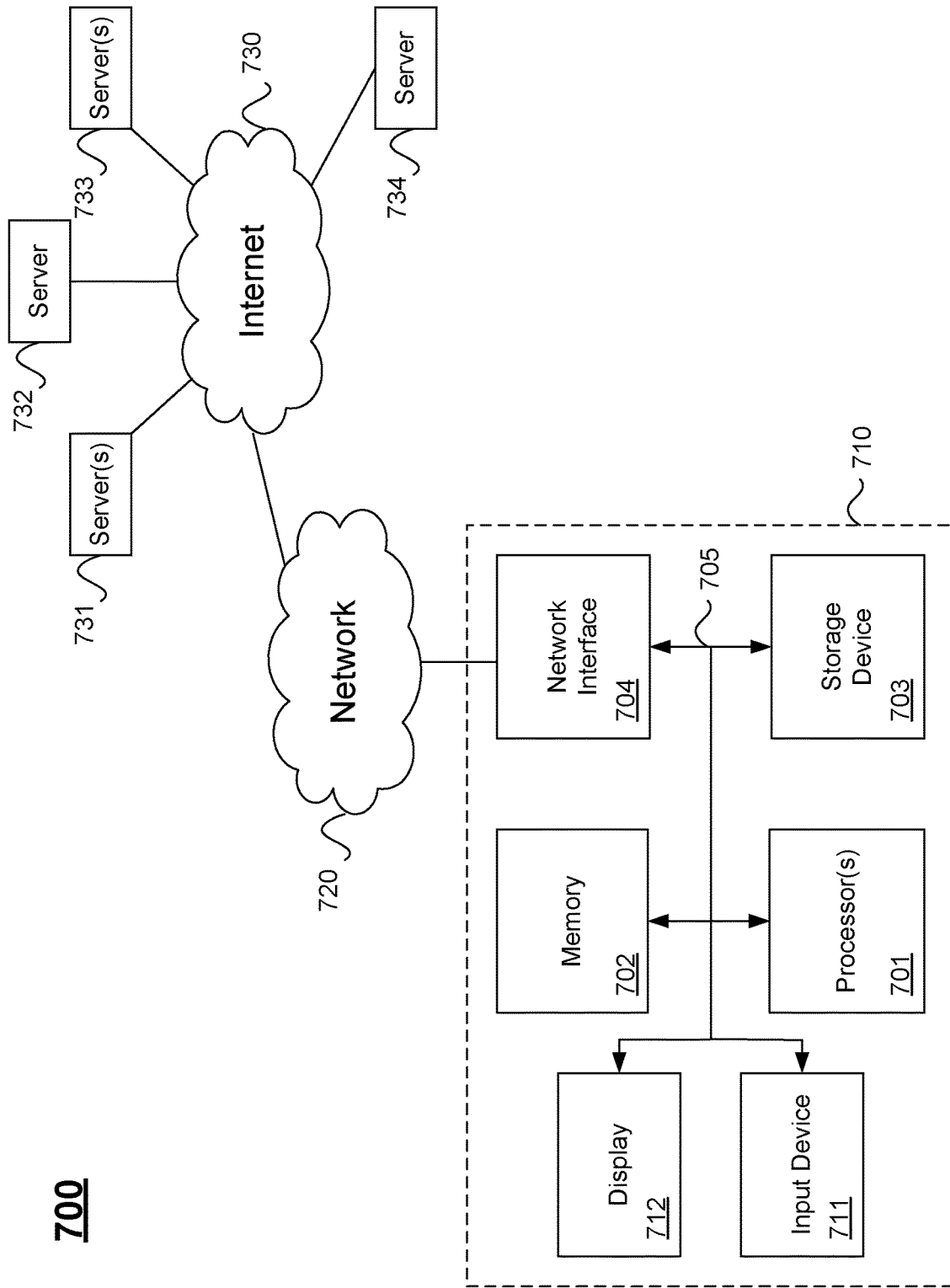
FIG. 7 illustrates computer system hardware configured according to the above disclosure.

FIG. 7 illustrates computer system hardware configured according to the above disclosure. The following hardware description is merely one illustrative example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. Computer system 710 also includes a memory 702 coupled to bus 705 for storing information and instructions to be executed by processor 701, including information and instructions for performing some of the techniques described above, for example. Memory 702 may also be used for storing programs executed by processor(s) 701. Possible implementations of memory 702 may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device 703 and memory 702 are both examples of non-transitory computer readable storage mediums.

Computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses for coupling various components of the computer together, for example.

Computer system 710 also includes a network interface 704 coupled with bus 705. Network interface 704 may provide two-way data communication between computer system 710 and a local network 720. Network 720 may represent one or multiple networking technologies, such as Ethernet, local wireless networks (e.g., WiFi), or cellular networks, for example. The network interface 704 may be a wireless or wired connection, for example. Computer system 710 can send and receive information through the network interface 704 across a wired or wireless local area network, an Intranet, or a cellular network to the Internet 730, for example. In some embodiments, a browser, for example, may access data and features on backend software systems that may reside on multiple different hardware servers on-prem 731 or across the Internet 730 on servers 732-735. One or more of servers 732-735 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
   storing, in a first software component of an authentication server, at least one credential for accessing a first system;
   storing, in the first software component, a plurality of user credentials for a plurality of users having access to a second system, the plurality of user credentials not previously or currently having access to the first system;
   linking, in the first software component, the plurality of user credentials for the plurality of users having access to the second system to the at least one credential for accessing the first system;
   receiving, in the first software component, a first user credential for a first user from the second system over a first connection, the first user credential not previously or currently having access to the first system;
   authenticating the first user credential, wherein the first user credential is authenticated when the first user credential matches one of the stored plurality of user credentials;
   establishing a second connection between the authentication server and first system using the at least one credential when the first user credential is authenticated, the second connection is established using a bidirectional socket; and
   sending a handle to the bidirectional socket to the second system to establish the second connection between the first system and the second system wherein the second system uses the handle to open the second connection between the first system and the second system.

2. The method of claim 1 further comprising linking one or more user credentials from the second system with the at least one credential for accessing the first system.

3. The method of claim 2 further comprising:
   linking a first plurality of user credentials from the second system with a first credential for accessing a first resource on the first system; and
   linking a second plurality of user credentials from the second system with a second credential for accessing a second resource on the first system.

4. The method of claim 2 further comprising linking a second one or more user credentials from the second system with the at least one credential for accessing a third system.

5. The method of claim 1 further comprising performing, by the first software component, a query comprising the first user credential, and in accordance therewith, retrieving a resource identification specifying the first system and a credential for accessing data or functionality for the first system.

6. The method of claim 1 wherein the second connection is only available for use by the first user based on the first user credential.

7. The method of claim 1 wherein the at least one credential is assigned to the first user by a second user having an account on the first system and provides limited access to the first system by the first user.

8. The method of claim 7 wherein a scope of limited access is specified by the second user having an account on the first system.

9. The method of claim 7 wherein a scope of limited access is read only.

10. The method of claim 1 wherein the second system is a web based application and the first system is a web based application.

11. The method of claim 1 wherein the second system is a data service, and the first system is an enterprise resource planning system.

12. The method of claim 1 further comprising:
storing, in a first software component, at least one resource identification specifying one of a plurality of systems as the first system; and
linking, in the first software component, the resource identification to the plurality of user credentials for the plurality of users having access to the second system and the at least one credential for accessing the first system.

13. The method of claim 1, wherein said linking comprises storing the plurality of user credentials and the at least one user credential in a same data structure.

14. The method of claim 1 wherein the authentication server closes the second connection prior to sending the handle to the bidirectional socket of the second connection to the second system to establish the second connection between the first system and the second system.

15. The method of claim 1, wherein the second system connects to the first system by binding to the bidirectional socket.

16. The method of claim 1 wherein the first software component stores a plurality of credentials corresponding to different roles on the first system, and wherein different credentials corresponding to different roles provide different access rights to different users of the second system.

17. A non-transitory machine-readable medium storing a program executable by at least one processing unit of a computer, the program comprising sets of instructions for:
storing, in a first software component of an authentication server, at least one credential for accessing a first system;
storing, in the first software component, a plurality of user credentials for a plurality of users, the plurality of user credentials not previously or currently having access to the first system;
receiving, in the first software component, a first user credential for a first user from a second system over a first connection, the first user credential not previously or currently having access to the first system;
authenticating the first user credential, wherein the first user credential is validated when the first user credential matches one of the stored plurality of user credentials;
establishing a second connection between the authentication server and first system using the at least one credential when the first user credential is authenticated, the second connection is established using a bidirectional socket; and
sending a handle to the bidirectional socket to the second system to establish the second connection between the first system and the second system wherein the second system uses the handle to open the second connection between the first system and the second connection.

18. The non-transitory machine-readable medium of claim 17 wherein the second connection is only available for use by the first user based on the first user credential.

19. The non-transitory machine-readable medium of claim 17 wherein the at least one credential is assigned to the first user by a second user having an account on the first system and provides limited access to the first system by the first user.

20. A computer system comprising:
a processor; and
a non-transitory machine-readable medium storing a program executable by the processor, the program comprising sets of instructions for:
storing, in a data service authentication server, at least one credential for accessing an enterprise resource planning system;
storing, in the data service authentication server, a plurality of user credentials for a plurality of users of a data service system, wherein users of the data service system extract data from or load data into at least one data store in the enterprise resource planning system, the plurality of user credentials not previously or currently having access to the enterprise resource planning system;
receiving, in the data service authentication server, a first user credential for a first user from the data service system over a first connection the first user credential not previously or currently having access to the first system;
authenticating the first user credential, wherein the first user credential is validated when the first user credential matches one of the stored plurality of user credentials;
establishing a second connection between the data service authentication server and the enterprise resource planning system using the at least one credential when the first user credential is authenticated, the second connection is established using a bidirectional socket; and
sending a handle to the bidirectional socket to the data service system to establish the second connection between the enterprise resource planning system and the data service system, wherein the data service system uses the handle to open the second connection between the enterprise resource planning system and the data service system.

* * * * *